(12) United States Patent
Johnson

(10) Patent No.: US 7,170,526 B1
(45) Date of Patent: Jan. 30, 2007

(54) METHOD AND APPARATUS FOR REDIRECTING THE OUTPUT OF DIRECT RENDERING GRAPHICS CALLS

(75) Inventor: Deron D. Johnson, Newark, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 246 days.

(21) Appl. No.: 10/959,932

(22) Filed: Oct. 5, 2004

Related U.S. Application Data

(60) Provisional application No. 60/539,434, filed on Jan. 26, 2004.

(51) Int. Cl.
*G06T 11/40* (2006.01)
*G09G 5/00* (2006.01)
*G09G 5/37* (2006.01)
*G06F 15/16* (2006.01)
*G06T 15/00* (2006.01)

(52) U.S. Cl. ............ 345/582; 345/530; 345/548; 345/552; 715/781; 715/782

(58) Field of Classification Search ........ 345/418–420, 345/422, 581–583, 530–531, 538–545, 552, 345/548, 556–557; 715/700, 763, 781–783, 715/806, 848; 709/201, 203, 217–219, 213, 709/230
See application file for complete search history.

(56) References Cited

U.S. PATENT DOCUMENTS

2005/0088452 A1*  4/2005  Hanggie et al. ............ 345/581

OTHER PUBLICATIONS

The Direct Rendering Manager: Kernel Support for the Direct Rendering Infrastructure, Richard E. Faith, Precision Insight, Inc, pp. 1-3.*
Direct Rendering Infrastructure, Wikipedia encyclopedia, p. 1.*

* cited by examiner

*Primary Examiner*—Wesner Sajous
(74) *Attorney, Agent, or Firm*—Park, Vaughan & Fleming LLP; Edward J. Grundler

(57) ABSTRACT

One embodiment of the present invention provides a system that facilitates redirecting the output of direct rendering graphics calls in a 3D window system. The system interposes a redirection library between an application and a direct rendering library in the 3D window system. This redirection library is a 3D foundation library that intercepts direct rendering calls. The redirection library routes the direct rendering calls to a display server. The display server renders the direct rendering calls into texture rather than rendering the direct rendering calls into a window on a screen of a display device. The system then displays the texture on a 3D shape through the display device.

51 Claims, 4 Drawing Sheets

METHOD AND APPARATUS FOR REDIRECTING THE OUTPUT OF DIRECT RENDERING GRAPHICS CALLS

RELATED APPLICATION

This application hereby claims priority under 35 U.S.C. 119 to U.S. Provisional Patent Application No. 60/539,434 filed 26 Jan. 2004, entitled "Redirecting the output of graphics rendering calls," by the same inventor as the instant application.

BACKGROUND

1. Field of the Invention

The present invention relates to graphical display systems. More specifically, the present invention relates to a method and an apparatus that facilitates redirecting the output of direct rendering graphics calls in a graphical display system.

2. Related Art

Today, most personal computers and other high-end devices support window-based graphical user interfaces (GUIs), which were originally developed back in the 1970's. These window-based interfaces allow a user to manipulate windows through a pointing device (such as a mouse), in much the same way that pages can be manipulated on a desktop. However, because of limitations on graphical processing power at the time windows were being developed, many of the design decisions for windows were made with computational efficiency in mind. In particular, window-based systems provide a very flat (two-dimensional) 2D user experience, and windows are typically manipulated using operations that keep modifications of display pixels to a minimum. Even today's desktop environments like Microsoft Windows (distributed by the Microsoft Corporation of Redmond, Wash.) include vestiges of design decisions made back then.

In recent years, because of increasing computational requirements of 3D applications, especially 3D games, the graphical processing power of personal computers and other high-end devices has increased dramatically. For example, a middle range PC graphics card, the "GeForce2 GTS" distributed by the NVIDIA Corporation of Sunnyvale, Calif., provides a 3D rendering speed of 25 million polygon-per-second, and Microsoft's "Xbox" game console provides 125 million polygon-per-second. These numbers are significantly better than those of high-end graphics workstation in the early 1990's, which cost tens of thousands (and even hundreds of thousands) of dollars.

As graphical processing power has increased in recent years, a number of 3D user interfaces have been developed. Some of these 3D user interfaces have been 3D window systems which display conventional 2D window system applications in a 3D environment on the display. These 3D window systems have focused on the conventional application's redirection of the output of 2D window system graphics libraries into a texture and have not addressed the use of direct rendering graphics libraries by these conventional applications.

Hence, what is needed is a method and an apparatus that facilitates efficient direct rendering of objects in a graphical display system without the problems described above.

SUMMARY

One embodiment of the present invention provides a system that facilitates redirecting the output of direct rendering graphics calls in a 3D window system. The system interposes a redirection library between an application and a direct rendering library in the 3D window system. This redirection library is a 3D foundation library that intercepts direct rendering calls. The redirection library routes the direct rendering calls to a display server. The display server renders the direct rendering calls into texture rather than rendering the direct rendering calls into a window on a screen of a display device. The system then displays the texture on a 3D shape through the display device.

In a variation of this embodiment, the output of the direct rendering call is directly rendered to the texture.

In a further variation, the output of the direct rendering call is first rendered to an off-screen memory buffer, and is then stored to the texture.

In a further variation, the texture is not shared between multiple clients.

In a further variation, the texture is shared between multiple clients and wherein the texture is locked by a given client when the texture is in use by the given client.

In a further variation, the system double buffers the texture. Double buffering the texture prevents the user from seeing partially rendered frames.

In a further variation, the system bypasses the redirection of direct rendering graphics calls if a number of conditions are satisfied for the window; the method further comprises disabling redirection so that the graphics calls are rendered to an elemental window in the display device. This allows increased rendering performance when the conditions are met.

In a further variation, if the direct rendering call is causing a 2D window to be rendered in a 3D window, and if a number of conditions are satisfied for the window, the method further comprises disabling redirection so that the graphic calls are rendered directly to an elemental window in the display device.

In a further variation, the conditions include the 3D window is parallel to the image plane of the 3D viewing transformation, the 3D window is 100% opaque, or the 3D window is not overlapped by any other graphical objects in the display server's scene graph.

DETAILED DESCRIPTION

Figure 1:
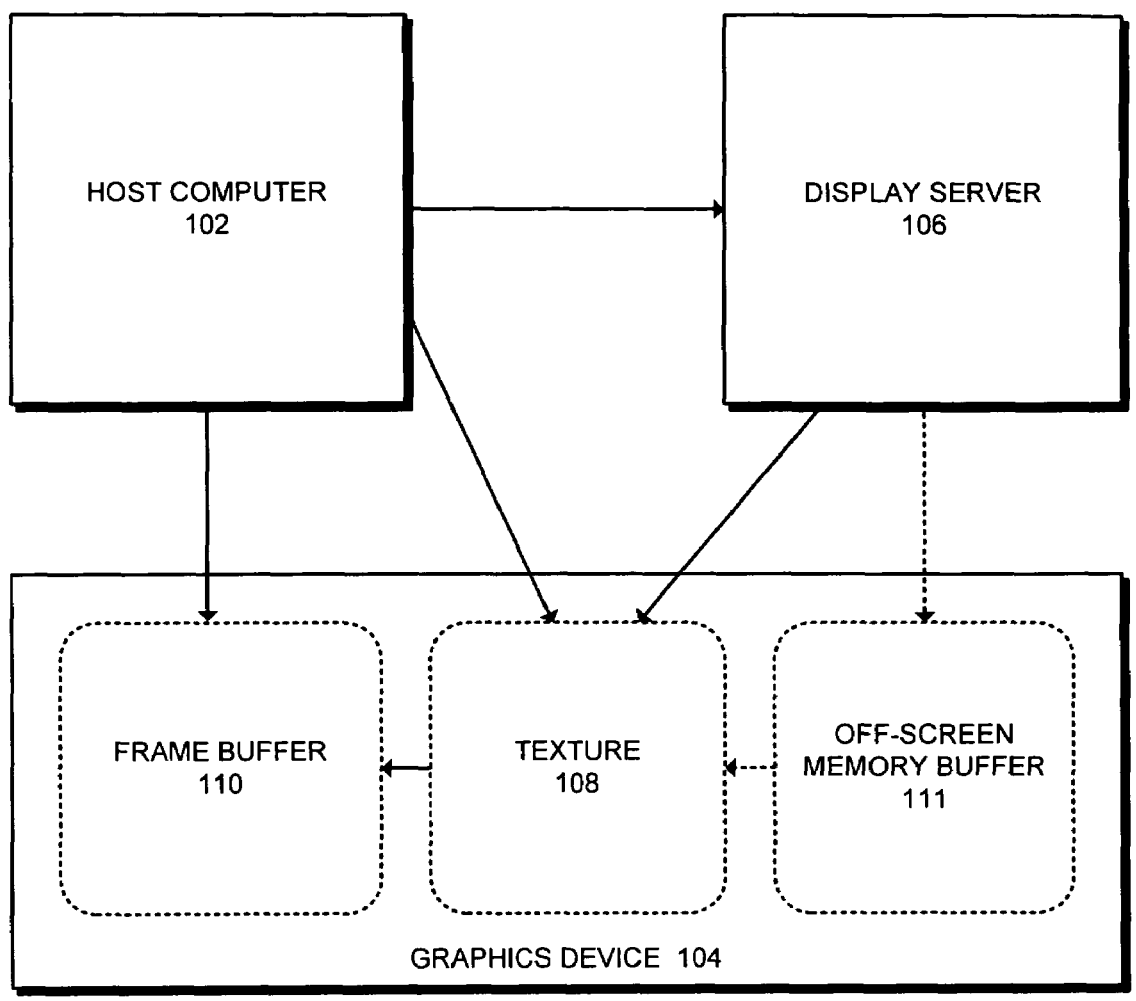
FIG. 1 illustrates a computer graphics system in accordance with an embodiment of the present invention.

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

I. Overview

This invention specifies a method and apparatus which redirects the output of direct rendering graphics calls of a direct rendering library into a texture map, from whence it can be mapped onto 3D objects in the 3D display model of a 3D window system. This method and apparatus can be used for output redirection for any type of direct rendering graphics library which uses direct rendering: a 3D graphics library, a video stream playback library, or even a 2D graphics library which uses direct rendering. For example, realizations of the OpenGL API often have a mode which uses direct rendering.

An important aspect of this invention is that the output is redirected without requiring modifications to be made to the code of the client applications.

The first step in output redirection for a direct rendering library is to cause client applications to call subroutines in a special library in place of subroutines in the direct rendering library. This special library is called the "Redirection Library." The Redirection Library is a dynamically loadable library (also called a dynamically loadable shared object). It is a component of the 3D window system. The purpose of this subroutine substitution is to cause the redirection code of the 3D window system to be executed whenever the client application makes a call to one of the subroutines in the direct rendering library and to prevent the normal direct rendering from occurring. For each API subroutine in the direct rendering library, the Redirection Library contains a corresponding subroutine of the same name. When the Redirection Library is loaded into the client address space, client subroutine calls that would have called into the direct rendering library now call into the Redirection Library. More details are described below in Section II.

Once the Redirection Library is in a position to get called every time the client application makes a call to the direct rendering library, it sends the output of the rendering request into a texture in different ways depending on the texture architecture of the foundation 3D graphics library. The foundation 3D graphics library is the 3D rendering library used by the 3D window system to render all objects visible on the display device. We refer to this library as the "3D Foundation Library." An example of a 3D Foundation Library is OpenGL.

This invention addresses computer systems with two types of 3D Foundation Library: one which supports "Interprocess Shared Textures" and one which does not. We refer to Interprocess Shared Textures, simply, as Shared Textures. When a client of the 3D Foundation Library allocates a texture, a unique texture identifier is assigned to the texture. In a 3D Foundation Library which does not support Shared Textures, each texture map allocated by a library client is accessible for data loading and rendering only within the address space of the client process and texture identifiers are unique only within the client process. In a 3D Foundation Library which supports Shared Textures, texture maps allocated by one library client are accessible to another client if that client knows the identifier of the texture. In the former type of library, no client can access the textures of other clients. In the latter type of library, a client can send a texture identifier to another client (via an interprocess communication mechanism) and the receiving client can access the texture. Specifically, the receiving client can command the graphics device to texture map the texture onto a 3D object. A method and apparatus for realizing Shared Textures within a 3D Foundation Library is described in Section III.

The method for realizing output redirection of a direct rendering library in a computer system whose 3D Foundation Library supports Shared Textures is different than the method for realizing output redirection of a direct rendering library in a computer system whose 3D Foundation Library does not support Shared Textures. A method and apparatus for the former is described in Section IV. A method and apparatus for the latter is described in Section V.

II. Client Subroutine Call Substitution Mechanism

The client subroutine call substitution mechanism is the method and apparatus by which the 3D window system substitutes the references in the client application to the subroutines of the direct rendering library with references to the corresponding subroutines of the Redirection Library. This section describes five different embodiments of this method and apparatus.

In all of these embodiments, the Redirection Library provides a set of subroutines with the exact same names as the set of subroutines provided by the direct rendering library.

In the first embodiment of the Call Substitution mechanism, the programmer who wrote the client application must specially prepare the application program before distributing it to users. This involves explicitly linking the application program with the Redirection Library. This linking is performed using the linker provided by the operating system of the host computer on which the application is being developed.

In a variation of this embodiment, the application is statically linked with Redirection Library. The code for the subroutines in the Redirection Library are loaded into the application's executable file at link time and instructions in the application code which make references (i.e. subroutine calls) to direct rendering library's API are modified to branch to the addresses of the corresponding routines in the Redirection Library instead. This is the only case which handles an application which is statically linked with the Redirection Library. In all other embodiments and variations described in this section the application is dynamically linked with the Redirection Library.

In a variation of this embodiment, the application is dynamically linked with the Redirection Library. In this case, the linker arranges for the Redirection Library to be located and loaded into the application executable when the executable program is run by the user. At this time, or on an as needed basis, subroutine call instructions in the application code which call routines in the direct rendering library's API are modified to branch to the addresses of the corresponding routines in the Redirection Library. The linker feature which enables this mechanism is called the "run-time linker." The run-time linker is a component of the operating system.

In the second embodiment of the Call Substitution Mechanism, the user who is running the client application explicitly instructs the run-time linker to link with the Redirection Library instead of the direct rendering library. For example, in the Solaris operating system, the user would set the LD_LIBRARY_PATH environment variable to point to the file system directory where the Redirection Library is stored instead of the file system directory where the direct rendering library is stored. In this embodiment, the Redirection Library has the same basic file name as the direct rendering library but the file system path names are different.

In the third embodiment of the Call Substitution Mechanism, the system administrator for the user's computer moves the direct rendering library from its standard location in the file system to another location in the file system. The system administrator then replaces it with the Redirection Library. As seen below, it is necessary for the Redirection Library to be able to dynamically load and link the actual direct rendering library. In this embodiment, the system administrator must put the actual direct rendering library in a file system directory the Redirection Library knows about.

The fourth embodiment of the Call Substitution Mechanism is one which can be used to realize this mechanism in the Solaris operating system. The Solaris program crle and the run-time linker provide a feature called "alternate objects." An alternate object is a dynamically linked library which is loaded by the run-time linker instead of a certain other library. This mechanism uses crle to specify that the Redirection Library is an alternate object for the direct rendering library. Using this mechanism, client programs that dynamically link with the direct rendering library end up being linked with the Redirection Library instead.

The fifth embodiment of the Call Substitution Mechanism is one which can be used to realize this mechanism in the Linux operating system. In this operating system, the file /etc/ld.so.preload specifies to the run-time linker a list of dynamically linked libraries to be loaded into each program prior to loading any other dynamically linked libraries. In this embodiment, /etc/ld.so.preload is modified to contain the file system path name of the Redirection Library. Thus, by the time the direct rendering library is loaded, any subroutine calls made by a client application have already been be resolved to call subroutines from the Redirection Library. The subroutines in the direct rendering library are ignored.

III. Realizing Shared Textures

This section describes a method and apparatus which enables a 3D graphics library to support Shared Textures. A 3D graphics library has within it a component called the "graphics device driver." This is a set of code which translates the high-level subroutine calls of the 3D graphics library into the commands of a particular graphics device. The API of the 3D graphics device provides client applications with a subroutine call (or set of subroutine calls) to allocate a texture. Within the client application, the texture is referred to by means of a texture identifier. For example, texture identifiers in a 3D graphics library might be realized using the set of integers.

Within the graphics device driver, there is a data structure which maps between texture identifiers and a set of device control commands and device memory access configurations which provide access to actual locations to the device memory locations for the textures.

In a 3D graphics library which does not support Shared Textures, the set of texture identifiers is unique only within each client process. Specifically, two client processes may have texture identifiers with the same values but which refer to different textures in the device's texture memory.

In a 3D graphics library which supports Shared Textures, the set of texture identifiers is allocated using a centralized mechanism which all client applications utilize. In addition, the data structure which maps between texture identifiers and device-specific texture memory access information is stored in a centralized "Texture Identifier Mapping" service. Each time the graphics device driver running within a client application needs to access the contents of a texture, it makes a request to the Texture Identifier Mapping service. In this request, the driver provides the texture identifier. The service responds with the device-specific texture memory access information which the graphics driver must configure in the device in order to access the contents of this texture.

In one embodiment of this invention, the Texture Identifier Mapping service is realized by code in the operating system device driver for a graphics device. This is a set of code which resides within the operating system which manages various aspects of controlling and operating the graphics device. Graphics device drivers usually transmit requests to their corresponding operating system device drivers via system calls. For example, the Unix operating system provides a system call named "ioctl" for making requests to operating system device drivers. In this embodiment, the operating system device driver supports several requests:

1. Allocate Texture

Allocate a texture with a specified size and other specified characteristics (such as the dimensionality of the texture, i.e. whether it is a 2D or 3D texture). This request allocates a memory address range within texture memory which holds the texture content and return to the caller a texture identifier for the texture.

2. Get Texture Configuration Information

Given a texture identifier, return the device control and configuration information which the graphics device driver should use to configure the graphics device in order to access the contents of, or to render, using the texture.

3. Deallocate Texture

Deallocate a texture with a specified texture identifier and allow its portion of texture memory to be used by other textures.

4. Lock Texture

In order to access a shared texture for the purposes of reading, writing, or rendering, the texture must be first locked. All users of the texture, including client applications as well as the Display server, must lock a shared texture while they are using it. When the use is complete, the texture must be unlocked (see the next request).

5. Unlock Texture

Unlocks the texture and so that other clients can lock the texture.

When the graphics device driver allocates a texture it uses the Allocate Texture Request. When the graphics device driver needs to read or write memory locations within the texture, or render using the texture, it uses the Get Texture Configuration Information Request of the operating system device driver, provides the texture identifier, and receives back device control and configuration information. The graphics device driver uses this information to configure the device and/or send commands to the device to place the device into a state where the content of the texture can be read, written, or used during rendering.

When the graphics driver is done using a texture, it calls the Deallocate Texture Request.

IV. Output Redirection in a System with a 3D Foundation Library with Shared Textures This section describes a method and apparatus to realize output redirection in a 3D window system whose 3D Foundation Library supports Shared Textures.

In such a system, the Display Server is the software component which performs all direct rendering graphics within the window system. This rendering is performed through the 3D Foundation Library. In this embodiment, the 3D Foundation Library supports Shared Textures.

The Redirection Library accomplishes output redirection for the direct rendering library by allocating a texture. Instead of performing normal graphics rendering operations to draw into a window on the screen, equivalent rendering operations are performed into drawing surface objects allocated by and controlled by the graphics device driver. There are two types of drawing surface objects: backing textures and off-screen memory areas. These are further described below.

IV.A. Graphics Device which Supports Render-to-Texture

In one embodiment of this invention, the graphics device supports the render-to-texture feature. In this case, the drawing surface on which rendering operations are performed is a texture. In this embodiment, the operating system device driver provides a Texture Identifier Mapping service which provides the requests defined in Section III. The graphics device driver allocates a 2D "backing texture" using the Allocate Texture Request of this service. The size of the backing texture is the same as the size of the window. The graphics device driver also uses the Get Texture Configuration Information Request to retrieve access information for this texture. For each rendering request received by the graphics device driver, the driver puts the device in the "render-to-texture" state and uses the information returned by this request to cause the resulting pixels of rendering operations to go into this texture. During these rendering operations, the texture is locked. When the rendering operations are complete, the texture is unlocked. The graphics device driver may lock and unlock the texture on each individual rendering operation, or it may lock and unlock a group of rendering operations.

For each window whose direct rendering output is redirected, the Redirection Library informs the Display Server that the window is being redirected. The Display Server creates in its scene graph a node for a 3D object which visually represents the redirected window. This object is called the 3D window. The graphical output for this window is rendered into the texture and texture mapped on this object.

For each window whose direct rendering output is redirected, the Redirection Library allocates a separate texture. The Redirection Library communicates to the display server, using an interprocess communication request, the fact that the rendering output to the window is being redirected, and the texture identifier of the backing texture.

Each time the Display Server renders its scene graph, when it encounters a node in the scene graph which represents a redirected window, the 3D Foundation Library must be instructed to configure the device to render using the backing texture for this window. To this end, the Display Server hands to the 3D Foundation Library the texture identifier which was given to it by the Redirection Library running in the client application. The device-independent portion of the 3D Foundation Library then hands the texture identifier to the graphics device driver. This driver uses the Get Texture Configuration Information request of the operating system driver. The information returned is used by the graphics device driver to configure the device into a state where the specified texture is used during rendering of the scene graph node. Before rendering this node, the graphics device driver locks the texture. When the rendering of this node is complete, the texture is unlocked.

IV.B. Graphics Device which does not Support Render-to-Texture

In one embodiment of this invention, the graphics device does not support the render-to-texture feature. In this case, the drawing surface on which Redirection Library rendering operations are performed is an off-screen memory buffer. This is an area in device video memory which can be rendered to, but which is not made visible on the display screen. In some 3D graphics libraries, such off-screen memory buffers are called "Pbuffers."

In this embodiment, when the Redirection Library redirects the graphics output of a window, it allocates both a backing texture and a backing off-screen memory buffer. The backing texture is allocated using the Allocate Texture Request of the operating system driver The Get Texture Configuration Information Request of the operating system driver is used to retrieve access information for this texture. In addition, the graphics device driver allocates an off-screen memory buffer of the same size as the window.

The graphics driver configures all rendering operations on the window to occur in the off-screen memory area instead. For each rendering request, the resulting pixels are placed in the off-screen memory area. At appropriate times (defined in Sections IV.B.1 and IV.B.2), the entire contents of the off-screen memory area are copied into the backing texture. The texture is locked prior to the copy and unlocked when the copy is complete.

For each window whose direct rendering output is redirected, the Redirection Library informs the Display Server that the window is being redirected. The Display Server creates in its scene graph a node for a 3D object which visually represents the redirected window. The graphical output for this window is rendered into the texture and texture mapped onto this object.

For each window whose direct rendering output is redirected, the Redirection Library allocates a separate texture. The Redirection Library communicates to the display server, using an interprocess communication request, the fact that rendering output to the window is being redirected and the texture identifier of the backing texture.

Each time the Display Server renders its scene graph, when it encounters a node in the scene graph which represents a redirected window, the 3D Foundation Library must be instructed to configure the device to render using the backing texture for this window. To this end, the Display Server hands to the 3D Foundation Library the texture identifier which was given to it by the Redirection Library running in the client application. The device-independent portion of the 3D Foundation Library then hands the texture identifier to the graphics device driver. This driver uses the Get Texture Configuration Information request of the operating system driver. The information returned is used by the graphics device driver to configure the device into a state where the specified texture is used during rendering of the scene graph node. Prior to rendering this node, the texture is locked. When the rendering of the node is complete, the texture is unlocked.

The next two sections define when the off-screen memory buffer is copied to the backing texture. The first section deals with the case when the window is double buffered and the second section deals with the case when the window is single buffered.

IV.B.1. Copying the Off-Screen Memory Buffer for a Double-Buffered Window

When the window whose output is being redirected is a double-buffered window, whenever the buffers are swapped, the entire contents of the off-screen memory buffer are copied into the backing texture. The texture is locked prior to the copy and unlocked when the copy is complete. For example, in OpenGL the API call which swaps the buffers is glSwapBuffers.

IV.B.2. Copying the Off-Screen Memory Buffer for a Single-Buffered Window

When the window whose output is being redirected is a single-buffered window, whenever the client flushes any deferred rendering in the graphics library the entire contents of the off-screen memory buffer are copied into the backing texture. The texture is locked prior to the copy and unlocked when the copy is complete. For example, in OpenGL the API call which flushes deferred rendering is glFlush.

IV.C. Shared Texture Locking

Shared textures may be locked by a variety of means. In this embodiment shared textures are locked as follows.

A shared memory area is allocated for each texture. This shared memory area contains a mutex. The client acquires the mutex prior to modifying the texture and releases the mutex after it is finished modifying the texture. Only one process may hold the mutex at any one time. So while the client holds the mutex the Display Server cannot acquire it and therefore cannot access the texture. Likewise, when the Display Server needs to render using the texture, it acquires the mutex. When rendering with the texture is finished, it releases the mutex. If a process attempts to acquire the mutex and finds it held by another process, the first process waits until the second process releases the mutex.

In a variation on this embodiment, the mutex in the shared memory area is an atomic compare-and-swap mutex. In another variation, it is a Dekker mutex.

On most graphics devices, the Display Server commands a series of rendering operations using a subroutine call (or series of subroutine calls) to the 3D Foundation Library. These commands are not guaranteed to be completed when the subroutine calls return. Rather, these subroutines merely place the rendering commands in a queue. These rendering commands are completed some time in the future. The 3D Foundation Library graphics device driver for such a graphics device provides a subroutine call for ensuring that all previously requested rendering commands have been completed and their resulting output pixels have been placed in device memory. The name for this type of mechanism is "asynchronous rendering." We call the subroutine which guarantees that rendering is completed; the "Finish Rendering Subroutine."

When using the above described texture locking mechanism on a device which uses asynchronous rendering, when the Display Server has locked a texture and is using it for rendering, the Display Server must call the Finish Rendering Subroutine prior to unlocking the texture. If the Display Server does not wait in this manner, the graphics device may render using the texture while the client is updating it.

To this end, when the Display Server renders the scene graph node (or nodes) corresponding to a legacy window, it should perform the following steps:

1. Lock the legacy window's backing texture.
2. Perform the 3D Foundation Library subroutine calls to render the node (or nodes) using the backing texture.
3. Call the Finish subroutine.
4. Unlock the backing texture.

IV.D. Shared Texture Double Buffering

In one embodiment of this invention, in order to increase the concurrency between client rendering into a texture and Display Server use of this texture, shared textures are managed in pairs. For each window whose output is being redirected there are actually two backing textures. One of these textures is used by the client for rendering the redirected output while the other is used by the Display Server for rendering objects in its scene graph. We call the first texture Texture A and the second texture Texture B. When the client has finished rendering into Texture A, it notifies the Display Server (via an interprocess communication channel) that the roles of the buffers should be swapped. When the Server receives this notification, it stops rendering using Texture B. The next time the Display Server renders its scene, graph Texture A is used. Texture A is used for Rendering until further notice is received from the client. When the Display Server puts the swap into effect, it sends an acknowledgement to the client (again via an interprocess communication channel). When the client receives this acknowledgement, it directs its next rendering into Texture B. In this way, the roles of the textures are continually swapped. This technique is called "Texture Double Buffering."

In this embodiment, it is not necessary to use a mutex to prevent concurrent access to the buffer contents because the client and Display Server never access the same texture at the same time. The swap notification and acknowledgement provide a means of arbitrating access to the textures so that only one process is accessing a given texture at any one time. However, it is necessary to use a mutex in order to protecting the memory location which indicates which buffer is being used for display.

In an embodiment of this invention which uses a backing off-screen memory buffer, the Double Buffering Mechanism can also be used. In this case, a backing texture is modified only when the contents of the off-screen memory buffer is copied into the texture. Although this copy is relatively fast, since it occurs asynchronously from scene graph rendering, it can result in the user seeing portions of the direct rendering graphics appear on the display device at different times. This piecemeal drawing can be objectionable to the user because it can result in the user seeing partially rendered frames and other visual artifacts. To solve this problem, we can use two backing textures and double buffer them. The scenario is the same as that described in the first paragraph of this section, except that the client rendering operations are replaced by copies from the off-screen memory buffer to one of the backing textures.

V. Output Redirection in a System with a 3D Foundation Library without Shared Textures This section describes a method and apparatus to realize output redirection in a computer system whose 3D Foundation Library does not support Shared Textures.

In this invention, the 3D window system has a process called the Display Server. This process performs all of the direct rendering graphics in the system. This rendering is performed via a 3D Foundation Library. In this embodiment, this library does not support Shared Textures.

In this case, instead of rendering to a texture directly, the Redirection Library communicates direct rendering library API calls to the Display Server using a protocol which operates through an interprocess communication channel. The Display Server is responsible for allocating the necessary drawing surfaces (texture and, possibly, an off-screen memory buffer), and it is responsible for performing the actual rendering to these surfaces. The Display Server uses the 3D Foundation Graphics Library to do this.

For each API subroutine in the direct rendering library, the Display Server supports a protocol request for that subroutine. Every time the client calls an API subroutine the corresponding subroutine in the Redirection Library is called. This routine creates a protocol request which contains an identifier of the API subroutine. Also included in the protocol request are the arguments which the caller provided in the subroutine call. The protocol request is placed in the communication channel to be sent to the Display Server. The communication channel provides a memory area for the client to write protocol requests. When no more space is available in this memory area, the contents are sent to the Display Server. Also, when rendering needs to be done (e.g. on a buffer swap or flush operation (see Section IV)), this memory area is flushed and the requests in the memory area are sent to the Display Server. Thus, the protocol requests are usually sent to the Display Server in large groups of requests.

In one embodiment of this invention, one which can be implemented on the Unix operating system, the software which manages the communication channel uses a combination of a Unix domain socket and a set of shared memory buffers. When small amounts of information are to be sent to the Display Server (e.g. graphics state change requests), they are sent to the Display Server via the socket connection. But when there is a large amount of information to be sent (e.g. geometrical data to be rendered), this data is placed in one of the shared memory buffers which is not in use. Shared memory buffers are ready to be sent when there is no more room in them or rendering needs to be done. At this time, the Display Server is notified that the buffer is ready by means of the client sending a BufferReady protocol packet over the socket. In addition, an identifier of the ready buffer is included in this packet.

In order to realize this embodiment, there is an asynchronous thread of control running within the Display Server which continuously tries to read protocol packets from the socket. When it reads a complete packet, it executes the request contained in that packet. If the request contains a graphics state change, this change is made in the Display Server's copy of the graphics state for that client. If the packet request is BufferReady, the Display Server extracts the buffer identifier from the packet and begins reading data out of this shared memory buffer, interpreting the rendering commands therein, and performing the requested rendering commands using the 3D Foundation Library. When the Display Server is finished interpreting and executing the shared memory buffer, it sends a BufferDone packet back to the client over the socket. If the client has run out of buffers, it tries to read the socket to see if there are any BufferDone packets which have been sent by the server. If it finds such packets in the socket, the client marks these buffers as being free (i.e. not in use). Then it uses one of these to satisfy its need for a buffer. If the client does not find any such packets in the socket, it blocks until some are sent by the Display Server.

The Display Server uses the 3D Foundation Library to perform client rendering requests. As in the Shared Texture embodiment, the 3D Foundation Library can use render-to-texture if the graphics device supports it. In this case, the Display Server has allocated a backing texture and instructs the 3D Foundation Library to render directly to this texture. If the graphics device does not support render-to-texture, the Display Server allocates both an off-screen memory buffer and a backing texture. It uses the 3D Foundation Library to render to the off-screen memory buffer and then, at the appropriate times, it copies the contents of the off-screen memory buffer into the backing texture. In this embodiment, the appropriate times are the same as the embodiment described in Section IV.B.

In this embodiment, there is no need to provide a Texture Identifier Mapping service, because the Display Server is the only process which allocates textures and renders to them.

V.A. Double Buffering Textures which are not Shared

In this embodiment, the same Texture Double Buffering mechanism described in Section IV.D. is used to avoid rendering artifacts. Even though the Texture Double Buffering mechanism was first mentioned in the context of shared textures, it can be used for unshared textures as well.

The problem is that within the Display Server there are two types of operations happening simultaneously in concurrent threads of control. The first types of operations are the rendering operations performed by the Display Server in response to commands coming from a client's Redirection Library via the interprocess communication channel. The other types of operations are the rendering operations initiated by the Display Server when it traverses its scene graph in order to render the scene graph on the display device. In general, these two types of operations are not synchronized and occur at different frequencies.

If the Display Server renders using a texture while it is being modified by the client, the user sees portions of the graphics within the texture being drawn. This piecemeal drawing can be objectionable to the user because it can result in flickering and other visual artifacts.

In order to solve this, the Texture Double Buffering mechanism can be used. The server creates two backing textures for each legacy window whose output is redirected. Call these Texture A and Texture B. Initially Texture A is used for client rendering and Texture B is used for scene graph rendering. The client sends rendering commands to the Display Server, which directs the output of these rendering commands into Texture A. In the meantime, the Display Server renders the scene graph object corresponding to the legacy window with Texture B. When the client is finished rendering, it sends a Swap Buffers command to the Display Server. The Display Server swaps the roles of the two textures: it then starts rendering its scene graph using Texture A. During the time the two buffers are being swapped, the Display Server thread of control which executes client rendering commands waits until the buffer swap is complete. When it is complete, client-commanded rendering to Buffer B can proceed.

In an embodiment of this invention which uses a backing off-screen memory buffer, the Double Buffering Mechanism can also be used. In this case, "client rendering" occurs to a backing texture only when the contents of the off-screen memory buffer are copied into the backing texture. Although this copy is relatively fast, since it occurs asynchronously from scene graph rendering, it is still possible for the user to see objectionable visual artifacts from this copy. To solve this problem, we can use two backing textures and double buffer them. The mechanism is the same as that described in the previous paragraph, except that the rendering commands from the client are replaced by copies from the off-screen memory buffer to one of the backing textures.

When the graphics device uses asynchronous rendering, as described in Section IV.C, it is necessary for the Display Server to call the Finish Rendering Subroutine before it can swap the textures.

VI. Avoiding Redirection in the 3D Foundation Library

It is possible that the 3D Foundation Library may be one of the client-accessible direct rendering libraries whose output we wish to redirect. In an embodiment of this invention that is using the third, fourth, or fifth embodiment of the Call Substitution mechanism (described in Section II), it is necessary that something special be done to avoid having the run-time linker substitute the Redirection Library in place of the 3D Foundation Library inside the Display Server. This section describes what must be done.

VI.A. Window Redirection State

In this embodiment, the Redirection Library for the 3D Foundation Library includes a copy of all of the subroutines in the 3D Foundation Library. Refer to section VI.D for a description of how this is realized. The Redirection Library maintains a data structure which contains the redirection state for every window it is instructed to render to. This data structure is a mapping between the identifier of the window and a RedirectionState variable. This data structure is called the Window Redirection State Mapping.

In a variation on this embodiment, the window identifier is the XID of a window in the X11 window system.

The RedirectionState variable indicates whether rendering to the window should be redirected. A value of 0 indicates that rendering to this window should not be redirected. A value of 1 indicates that rendering to this window should be redirected.

When the Redirection Library is instructed by the client to render to a certain window, the Redirection Library looks up the window's identifier in the Window Redirection State Mapping. If an entry in this mapping already exists which contains the window's identifier, the value of the entry's RedirectionState variable is returned. The use of this value is described below.

If the window's identifier is not found in the Window Redirection State Mapping, a new entry is created and added to the mapping. The initial value of the RedirectionState variable of the new mapping is 1.

In a variation of this embodiment, the Window Redirection State Mapping is realized using a hash table.

Whenever a new entry is created in a client's Window Redirection State Mapping, a protocol request is sent to the Display Server, via an interprocess communication channel, to inform the Display Server that this client has created such an entry. The purpose of this is described in Section VII.B.

VI.B. Redirection Control Subroutine

In this embodiment, the Redirection Library contains an "externally visible" Redirection Control Subroutine. By externally visible, we mean that clients can make calls to this subroutine. The name of this subroutine must be defined to be unique enough so that it is unlikely for any client software to contain its own definition of a subroutine with the same name. In a variation of this embodiment, the actual name of the Redirection Control Subroutine is prefixed with four underscores, for example "____3D_Window System_RedirectionControl."

The Redirection Control Subroutine changes the value of an "internally visible" global variable called GlobalRedirectState. By "internally visible, we mean that clients cannot make references to this variable. This is an integer valued variable whose values are allowed to be either 0 or 1. The Redirection Control Subroutine has a single integer argument. When it is called, the Redirection Control Subroutine sets the value of the GlobalRedirectState variable to the value of its argument. Initially, the value of this variable is 1.

Each of the direct rendering API replacement subroutines provided by the Redirection Library check the value of the GlobalRedirectState variable as the first thing they do when called. If the value of this variable is 1, the Window Redirection State Mapping is consulted to see if it has an entry for the current window. If such an entry exists, and the value of its RedirectState variable is 1, the graphical output or graphical state change commanded by that subroutine is redirected using the mechanisms described in Sections IV or V. But if the value of this variable is 0, or no entry for the current window is found, the corresponding real 3D Foundation Library subroutine is called instead and normal graphics rendering is directed to the window.

Some direct libraries require the identifier of the window to be passed as an argument to every API subroutine call. Other direct rendering libraries have a special API subroutine which the client can use to specify the "current window" for subsequent API calls. This is called the MakeCurrentWindow subroutine. In a variation on this embodiment which applies to the latter type of direct rendering library, the Redirection Library's realization of the MakeCurrentWindow subroutine caches the RedirectState value for the window in a global variable called CurrentWindowRedirectState. To do this caching, MakeCurrentWindow performs a lookup on the Window Redirection State Mapping to find an entry whose window identifier matches that of the argument window identifier. If such an entry is found, the variable CurrentWindowRedirectState is set to the RedirectState of the entry. If no such entry is found, CurrentWindowRedirect state is set to 1. In this variation, the other API subroutines in the Redirection Library do not need to perform a lookup on the Window Redirection State Mapping each time they are called. Instead, they only need to check the value of the CurrentWindowRedirectState variable.

VI.C. Avoiding Redirection Within the Display Server

When clients are linked with, and use the 3D Foundation Library, the Redirection Library is loaded and the value of the GlobalRedirectionState variable is 1 and remains set to this value throughout the lifetime of the client. Thus, the 3D Foundation Library calls made by the client are always redirected.

When the Display Server is linked with the 3D Foundation Library, before the Display Server makes any calls to this library, it calls the Redirection Control Subroutine with an argument of 0. This sets the value of the GlobalRedirectState variable to 0. Thus, whenever the Display Server makes a call to one of the 3D Foundation Library subroutines, and the corresponding routine in the Redirection Library is called, the call is not redirected and the subroutine in the real 3D Foundation Library is called to perform actual rendering directly to the display device.

VI.D. Including the Real 3D Foundation Library in its Own Redirection Library

In order to accomplish the behavior described in Sections VI.B and VI.C, the Redirection Library must load in and be linked with the subroutines of the actual direct rendering library. But since the subroutines in the Redirection Library and the direct rendering library have exactly the same names something special must be done to keep the run-time linker from generating a multiple symbol definition error. This section describes a method and apparatus for realizing this.

In one embodiment of this invention, the Redirection Library uses two capabilities of the run-time linker of the operating system:
1. A subroutine which dynamically loads and links a specified library at run-time given a file system path name to the library. This subroutine returns an identifier to the loaded library. This subroutine is called LoadDynamicLibrary. An essential attribute of this subroutine is that, as it links subroutines from the dynamically loaded library, it doesn't care if there is a subroutine of the same name already loaded into the client; it doesn't treat this as an error condition.
2. A subroutine which, when given the identifier of a loaded library and the name of a symbol within that library, returns the address of the symbol. (The symbol is usually a function name). This subroutine is called FindSymbolAddress.

In a variation of this embodiment which operates within the context of the Unix operating system, the LoadDynamicLibrary subroutine corresponds to the Unix dlopen subroutine and the FindSymbolAddress subroutine corresponds to the Unix dlsym subroutine.

When the Redirection Library is first loaded and its first subroutine is called by the client, the Redirection Library uses LoadDynamicLibrary to load and link the actual direct rendering library. Next the Redirection Library calls FindSymbolAddress for every subroutine name in the direct rendering library API. These addresses are stored and used as described below.

Here is the pseudo-code for a typical Redirection Library API subroutine. All Redirection Library API subroutines follow this pattern:

```
foo (arguments . . . )
{
if (GlobalRedirectState ==1 &&
    CurrentWindow RedirectState ==1)
    Redirect_foo(arguments . . . );
}else {
    (*Actual_foo)(arguments . . . );
}
}
```

Note that this example is for the variant in which the direct rendering library supports the concept of a current window. In this example, "foo" is the name of an API subroutine. In the client, calls to foo in the direct rendering library have been substituted with calls to foo in the Redirection Library. "Redirect_foo" is an internal Redirection Library subroutine which performs the rendering to the backing texture. "Actual_foo" is the address of the actual direct rendering library subroutine named foo. This address was discovered when the Redirection Library made its calls to FindSymbolAddress. Finally, the statement "(*Actual_foo)( )" is a call to the subroutine whose address is stored in the variable Actual_foo.

VII. Use of Elemental Windows in a 3D Window System

VII.A. Elemental Window Management Services in a 3D Window System

In addition to its mechanisms to create and display 3D objects representing windows, the 3D window system of this invention also provides a mechanism to create and display 2D windows. These windows are managed using all of the usual techniques of a 2D window system: there is a 2D window hierarchy with parent/child relationships, 2D windows can overlap each other (in a plane which is parallel to the image plane of the 3D viewing transformation), 2D windows which are obscured by others have their drawable shape (i.e. clipping shape), and visible shapes suitably constrained by the visible shape of the obscuring windows, 2D windows can be made visible or invisible, and 2D windows can be moved and resized. In this invention, this type of window is called an Elemental window and the service which manages them is is called the "Elemental Window Management Service." This service provides all of the operations that a typical 2D window system does. In addition, the Elemental Window Management Service provides direct rendering access to Elemental windows.

The reason that this type of 2D window is called "elemental" is that non-elemental windows, which are created and rendered to by client applications, are subject to output and input redirection. An elemental window is not subject to any redirection at all; any rendering which is performed on them goes directly to the display device. Only the Display Server can create elemental windows and control their visibility.

The reason for including the Elemental Window Management Service in this invention is explained in the remainder of this section and in Sections VII.B, VII.C, and VII.D.

In one embodiment of this invention, the Elemental Window Management Service is inside the address space of the Display Server process. The Display Server accesses the services of this service by making subroutine calls.

In another embodiment, the Elemental Window Management Service is in a separate process. This process is called the Elemental Window Server. The Display Server communicates with the Elemental Window Server using an interprocess communication channel and a protocol. This protocol provides requests for creating windows, positioning them, making them visible, allowing direct rendering access, etc.

In this embodiment, both the Display Server and the Elemental Window Management Server reside on the same computer, so they use a shared memory interprocess communication channel.

In a variation of this embodiment, the Elemental Window Management Service is an X11 server and the interprocess communication protocol is the X11 protocol.

In the normal state of the system, there is only one elemental window which is visible on the display device. This is a full-screen window. The 3D window manager of the 3D window system never allows it to obscure any other elemental windows. In addition, the 3D window manager reparents all elemental windows which are created to be children of this window. This window is called the "Root Elemental Window."

When the Display Server is first run, it configures the 3D Foundation Library to perform direct access to the Root Elemental Window. All of the rendering performed by the Display Server goes to the Root Elemental Window.

In this invention, there are times when it is necessary to create elemental windows and make them visible. When visible, these elemental windows obscure the Root Elemental Window (and possibly other elemental windows). The elemental Window Management Service modifies the drawable and visible shapes of the Root Elemental Window, the new elemental window, and other visible elemental windows to reflect the current state of the window hierarchy, the window stacking order, and the positions and sizes of the windows on the display device. In particular, the Elemental Window Management Service allows direct rendering to be performed to elemental windows.

In addition to providing management services for the window hierarchy of elemental windows, the Elemental Window Management Service also provides event routing services typical of a 2D window system. For example, mouse events which occur over the visible region of a particular window are sent to clients who have expressed interest in receiving events which occur over that window. In addition, keyboard events are sent to clients who have expressed interest in receiving keyboard events for the current "keyboard focus" window. In addition, clients can express interest in receiving events when the cursor enters a particular window or exits a particular window. These are all examples of the types of event processing performed by the Elemental Window Management Service. This service performs all of the event routing and distribution operations of a typical 2D window system.

In a variation of this embodiment, the Elemental Window Management Service performs all of the event management operations of an X11 window server.

VII.B. Handling Texture and Off-screen Memory Buffer Allocation Failure

Textures and off-screen memory buffers are relatively scarce resources which must be shared among all clients running in the 3D window system. At certain times, if the Display Server needs to allocate a backing texture or an off-screen memory area for a 3D window there may not be one which is not already in use, so the allocation cannot be granted.

When the Redirection Library is first loaded into a client, it creates an interprocess communication channel to the Display Server and asynchronous thread of control. This thread continually listens to the interprocess communication channel for commands sent by the Display Server. These commands are described below.

In a variation of this embodiment, the interprocess communication connection is a Unix domain socket.

When a client creates a 2D legacy window for the first time, the Display Server is notified. The Display Server attempts to allocate a backing texture for that window. In an embodiment that also uses an off-screen memory area for redirection, the Display Server also attempts to allocate an off-screen memory area. If either of these allocations fails, the following actions are performed:
1. The Display Server expresses interest in receiving "Expose Events" for the elemental window corresponding to the 3D window. The Elemental Window Management Service sends such an event when the elemental window is first made visible on the display device.
2. The Display Server sends a command to the Elemental Window Management Service to make the elemental window visible on the screen. When the window is visible on the Display Device, the Elemental Window Management Service sends an Expose Event to the Display Server.
3. When the Display Server receives this Expose Event, it notifies the client who created the 3D window that the value of the RedirectionState variable should be set to 0. It also notifies the client of the identifier of the elemental window.
4. When the creating client receives this notification, it performs a lookup of the window in its Window Redirection State Mapping. It sets the value of the RedirectState variable of the window's entry to 0.

When the creating client makes calls to the subroutines of the direct rendering library the corresponding subroutines of the Redirection Library are called instead. Subroutines of the Redirection Library that perform rendering to the 3D window uses the Window Redirection State Mapping to determine that rendering to this window is not to be redirected. Instead, subroutines of the actual direct rendering library are called to perform direct rendering to the corresponding elemental window.

VII.C. Optimizing Rendering Performance Using Elemental Windows

This section describes a method and apparatus for opportunistically suspending output redirection for a direct rendering library. The following section, Section VII.D, describes a method and apparatus for opportunistically suspending output redirection for clients who render to 2D legacy windows.

In certain configurations of the 3D windows of this invention, it is possible to use elemental windows to increase rendering performance. If a 3D window meets the following conditions, its visual representation on the display device can be replaced with an elemental window:
1. The shape of the 3D window is rectangular.
2. The orientation of the 3D window is parallel to the image plane of the 3D viewing transform.
3. The window is 100% opaque.
4. The window is not overlapped by any other graphical objects in the Display Server's scene graph.

If all of these conditions hold, redirection is disabled for all clients who attempt to render to the window. Specifically, the following actions are performed to realize this:
1. If this is the first time the Display Server has disabled redirection for the 3D window, it creates a corresponding elemental window. If it is not the first time, the elemental window previously created is used. The Display Server instructs the Elemental Window Manager Service to position the elemental window at the exact same location on the display device as the 3D window and with the exact same size as the 3D window.
2. The first time the Display Server creates an elemental window, it instructs the Elemental Window Management Service to create an off-screen memory buffer. This buffer is called the "backing pixmap" of the elemental window.
3. The Display Server then expresses interest in receiving "Expose Events" for the elemental window.
4. The current contents of the backing texture (or backing off-screen memory buffer, if one is being used) are copied into the backing pixmap.
5. The Display Server instructs the Elemental Window Management Service to make the elemental window visible.
6. When the Elemental Window Management Server makes the window visible, it renders the contents of the elemental window's backing pixmap to the display device. But, since the four conditions listed above hold, the pixels which are rendered to the display device are identical to the pixels which are already displayed in that region. Thus, the user does not notice any visible change. Therefore, the entire process of suspending redirection on a 3D window is "seamless."
7. When the window is visible on the display device, the Elemental Window Management Service sends an Expose Event to the Display Server.
8. When the Display Server receives this Expose Event, it notifies all clients who have an entry for this window in their Window Redirection State Mapping (see Section VI.A) that the RedirectionState variable for that window should be set to 0. It also notifies these clients of the identifier of the elemental window.

9. In Section VII.B, it was described how there is an asynchronous thread of control running in each client listening for any of the notifications described in the previous step. When a client receives such a notification, it performs a lookup of the window in its Window Redirection State Mapping. It sets the value of the RedirectState variable of the window's entry to 0. Future client rendering directed to the 3D window is directed to the elemental window.

10. Finally, the scene graph subgraph which corresponds to the 3D window is detached from the Display Server's scene graph.

At this point, as described in Section VII.B, when any client makes calls to the subroutines of the direct rendering library, the corresponding subroutines of the Redirection Library are called instead. Subroutines of the Redirection Library that perform rendering to the 3D window uses the Window Redirection State Mapping to determine that rendering to this window is not to be redirected. Instead, subroutines of the actual direct rendering library are called to perform direct rendering to the corresponding elemental window.

If the Display Server is asked to make a scene graph change in which the four conditions for suspension of redirection no longer hold, the Display Server first suspends direct rendering to the elemental window and reinstate output redirection. Then it makes the scene graph change. Specifically, the following actions are performed:

1. The Display Server reattaches the scene graph subgraph corresponding to the 3D Window into its scene graph. The 3D would be visible again except that its elemental window is obscuring it.
2. The Display Server instructs the Elemental Window Management Service to make the elemental window not-visible. At this point, the 3D window is once more visible.
3. The Display Server waits for the Elemental Window Management Service to make the elemental window not-visible. Then the Display Server notifies all clients who have an entry for this window in their Window Redirection State Mapping (see Section VI.A) that the RedirectionState variable for that window should be set to 1.
4. The Display Server then performs the scene graph change that was requested.
5. In Section VII.B, it was described how there is an asynchronous thread of control running in each client listening for any of the notifications described in the previous step. When a client receives such a notification, it performs a lookup of the window in its Window Redirection State Mapping. It sets the value of the RedirectState variable of the window's entry to 1. Future client-rendering directed to the 3D window are redirected to its backing texture.

During the time any change in the RedirectState occurs, the Display Server prevents any changes from being made to its scene graph. But scene graph rendering still occurs during this period.

In this embodiment, the method by which a client creates an entry in its Window Redirection State Mapping is slightly different than what was described in Section VI.A. The different behavior is as follows:

1. When the Redirection Library is instructed by the client to render to a certain window, the Redirection Library looks up the window's identifier in the Window Redirection State Mapping. If an entry in this mapping already exists which contains the window's identifier, the value of the entry's RedirectionState variable is returned. (This behavior is exactly what was described in Section VI.A)
2. If the window's identifier is not found in the Window Redirection State Mapping, the Display Server is asked (via an interprocess communication channel) whether it knows the current value of RedirectState for the window. If the server knows the current value of the RedirectState for the window, it responds to the client and tell the client what it is.
3. If the Display Server tells the client that it knows the value of RedirectState for that window, the client uses this as the initial value when it creates the entry in the Window Redirection State mapping. If the Display server tells the client that it does not know the value, the client uses a value of 1.

VII.D. Optimizing the Performance of Redirected Legacy 2D Window Applications

This section describes a method and apparatus for opportunistically suspending output redirection for clients who render to 2D legacy windows. As in Section VIII, when the scene graph object for such a window adheres to certain conditions, output redirection for this window can be suspended.

In an embodiment of this invention, if a legacy 2D window client wishes to create a window it contacts the Elemental Window Management Service directly. The Elemental Window Management Service creates the window but it ignores any requests from the client to make the window visible. The Elemental Window Management Service stores a RedirectionState variable for the window and initializes the value of this variable to 1.

In a variation on this embodiment in which the 3D Foundation Library supports Shared Textures, the Elemental Window Management Service informs the Display Server that a new window has been created. The Elemental Window Management Service then allocates a backing texture for it (and possible also an off-screen memory buffer). When the RedirectState variable for the 2D legacy window has the value of 1, the Elemental Window Management Service redirects client rendering requests to render into the texture (possibly through the intermediary of the off-screen memory buffer). This texture is mapped onto a 3D object in the Display Server's scene graph which is the 3D window that represents the 2D legacy window in the 3D display model. The same locking mechanisms described in Sections III and IV for the output redirection of a direct rendering library using Shared Textures also apply to this case.

In another variation on this embodiment in which the 3D Foundation Library does not support Shared Textures, the Display Server allocates the backing texture and the Elemental Window Management Service allocations a buffer in a shared memory area. When the RedirectState variable for the 2D legacy window has the value of 1, the Elemental Window Management Service redirects client rendering requests to render into the host memory buffer and then it informs the Display Server through an interprocess communication channel that the host memory buffer needs to be copied to the texture. When the Display Server receives this notification, it copies the contents of the shared memory buffer into the texture.

When the four redirection suspension conditions (mentioned in Section VII.C) hold, the Display Server suspends redirection for a 2D legacy window. All ten steps for suspending redirection, described in Section VII.C, are performed. The only difference is that, in this case, the Elemental Window Management Service itself acts in the role of the client.

If the Display Server is asked to make a scene graph change in which the four conditions for suspension of redirection no longer hold, the five steps for reinstating redirection, described in Section VII.C, are performed. The only difference is that, in this case, the Elemental Window Management Service itself acts in the role of the client.

In both of these variations, Texture Double Buffering, as described in IV.D and V.A. may be used to minimize objectionable visual artifacts.

Computer Graphics System

FIG. 1 illustrates a computer graphics system in accordance with an embodiment of the present invention. The computer graphics system includes host computer 102, graphics device 104, and display server 106. Graphics device 104 includes frame buffer 110, off-screen memory buffer 111, and texture 108.

Host computer 102 can generally include any type of computer system, including, but not limited to, a computer system based on a microprocessor, a mainframe computer, a digital signal processor, a portable computing device, a personal organizer, a device controller, and a computational engine within an appliance. Host computer 102 supports software, which generates 3D graphics.

Display server 106 can generally include any type of server which supports direct rendering graphics calls in a 3D display system.

Graphics device 104 can generally include any type of device that stores and displays graphics output to a user (not shown). Frame buffer 110 stores images to be displayed to an output device, while texture 108 holds textures to be mapped onto a 3D shape. Note that texture 108 may be double-buffered.

Display server 106 can be configured such that all rendering operations on the window occur to off-screen memory buffer 111. At appropriate times (defined in sections IV.B.1 and IV.B.2), the contents of off-screen buffer 111 are copied to texture 106. Texture 106 is locked prior to the copy and unlocked when the copy is complete.

Code Structure

Figure 2:
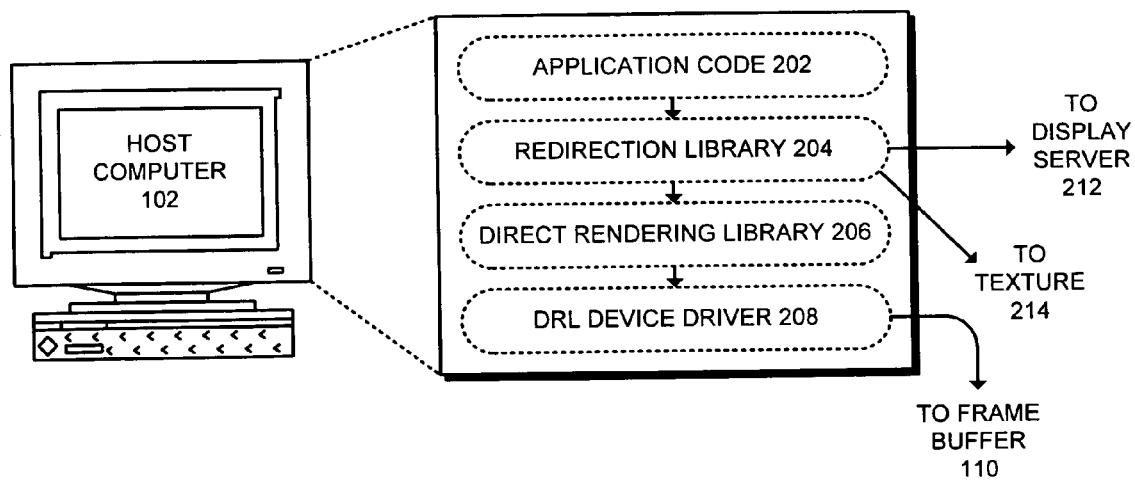
FIG. 2 illustrates the code structure in the host computer in accordance with an embodiment of the present invention.

FIG. 2 illustrates the code structure in host computer 102 in accordance with an embodiment of the present invention. Host computer 102 includes application code 202, direct rendering library 206, and DRL device driver 208. Redirection library 204 has been interposed between application code 202 and direct rendering library 206 to capture direct rendering library calls from application code 202. Redirection library 204 includes routines with identical names for each routine in direct rendering library 206. In this way, redirection library 204 can receive the direct rendering library calls without any modification to application code 202.

Upon receiving a direct rendering library call, the code within redirection library 204 can do a number of things. It can call the original code within direct rendering library 206; route the parameters of the call to a routine within display server 106 across line 212; or write the texture directly across line 214. If the direct rendering library call is passed to direct rendering library 206, code within direct rendering library 206 causes direct rendering library (DRL) device driver 208 to generate output to frame buffer 110.

Routing Direct Rendering Service Calls

Figure 3:
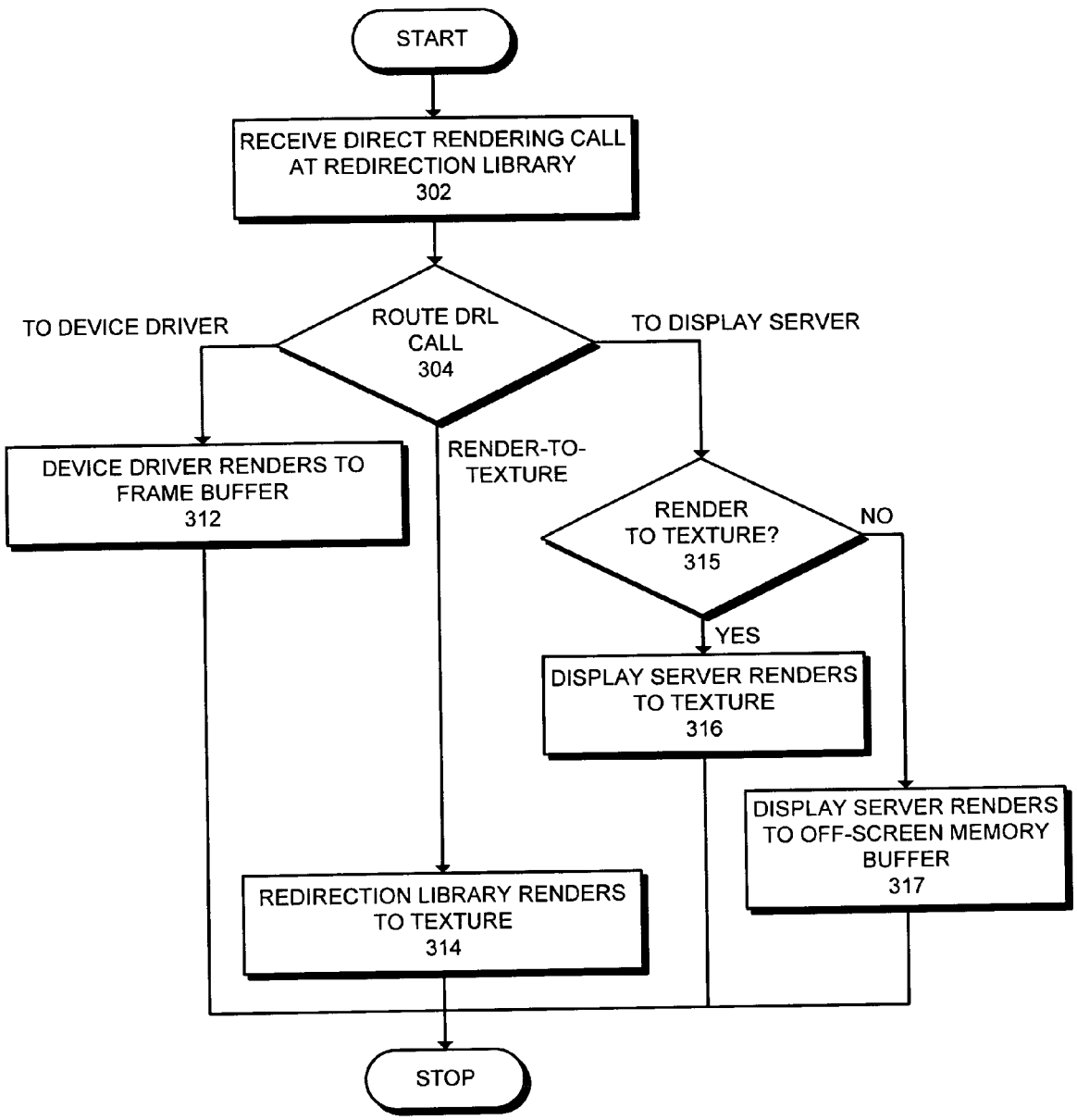
FIG. 3 presents a flowchart illustrating the process of routing direct rendering service calls in accordance with an embodiment of the present invention.

FIG. 3 presents a flowchart illustrating the process of routing direct rendering service calls in accordance with an embodiment of the present invention. The system starts when a direct rendering service call is received at the redirection library (step 302). Next, the redirection library routes the DRL service call depending upon the setup and specific conditions within the display system (step 304). The possible routings are to the device driver, to the display server, or rendering directly to the texture.

If the DRL service call is routed to the device driver, the device driver renders to the device frame buffer (step 312). If the DRL service call is handled by the redirection library, the redirection library renders to the texture (step 314). If the DRL service call is routed to the display server, the display server can be set to render to texture or to render to an off-screen memory buffer (step 315). If the display server is set to render to texture, the display server renders to texture (step 316). Otherwise, the display server renders to the off-screen memory buffer (step 317).

Rendering to an Elemental Window

Figure 4:
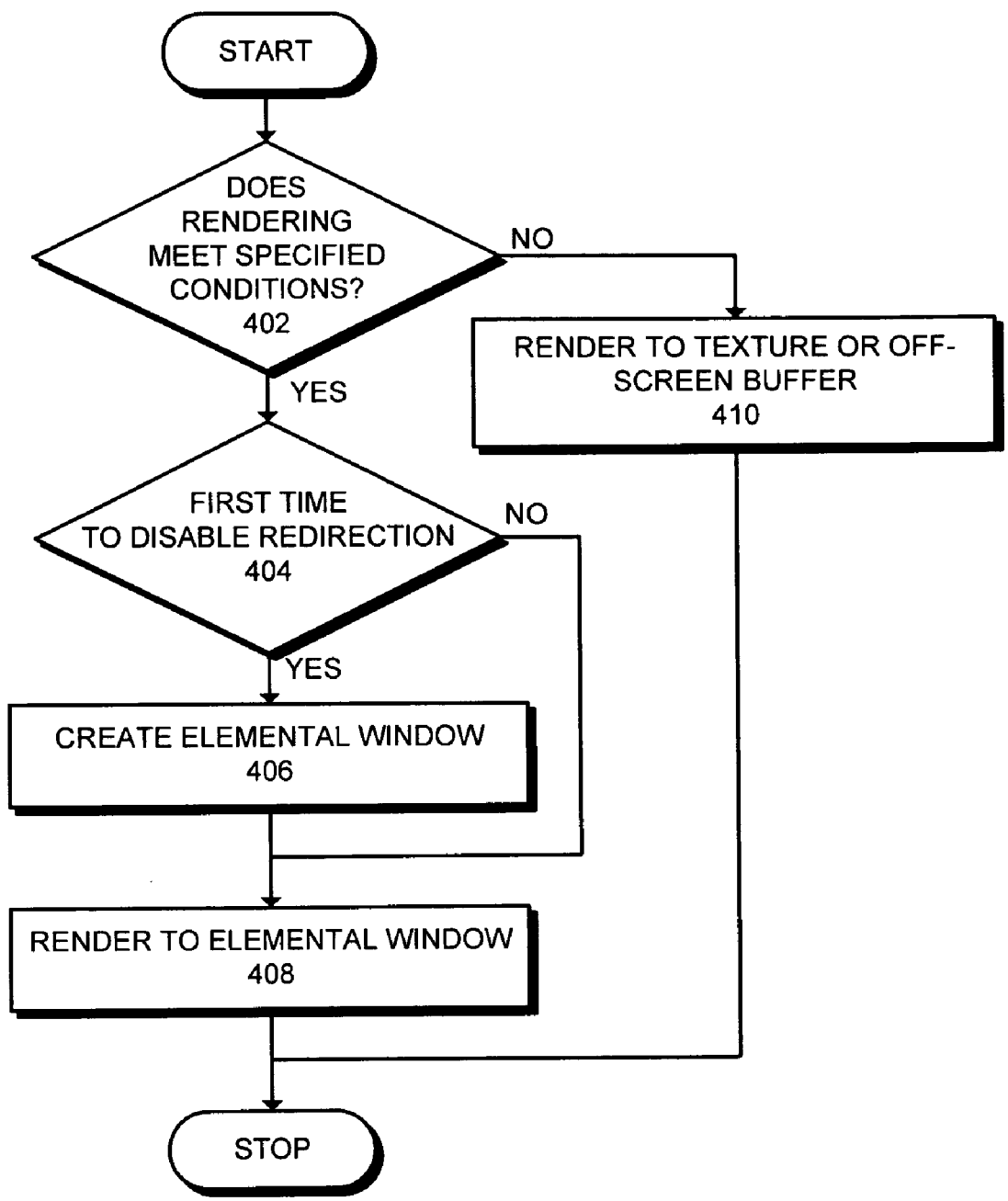
FIG. 4 presents a flowchart illustrating the process of rendering to an elemental window in accordance with an embodiment of the present invention.

FIG. 4 presents a flowchart illustrating the process of rendering to an elemental window in accordance with an embodiment of the present invention. The system starts by determining if a rendering meets specified conditions (step 402). These specified conditions include: the shape of the 3D window is rectangular, the orientation of the 3D window is parallel to the image plane of the 3D viewing transform, the window is 100% opaque, and the window is not overlapped by any other graphical objects in the display server's scene graph.

If all of the specified conditions are met, the system next determines if this is the first time to disable redirection (step 404). If so, the system creates an elemental window (step 406). After creating the elemental window or if this is not the first time to disable redirection at step 404, the system renders to the elemental window (step 408) thereby completing the process. If the rendering does not meet the specified conditions at step 402, the system renders to texture or to the off-screen buffer as described above (step 410).

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method for redirecting an output of direct rendering graphics calls in a 3D window system, comprising:
   interposing a redirection library between an application and a direct rendering library in the 3D window system;
   intercepting a direct rendering call in the redirection library;
   routing the direct rendering call to a display server;
   rendering the direct rendering call through the display server into a texture rather than rendering the direct rendering call into a window on a screen of a display device; and
   displaying the texture on a 3D shape on the display device.

2. The method of claim 1, wherein the texture is not shared between multiple clients.

3. The method of claim 1, wherein the output of the direct rendering call is directly rendered by the display server to the texture.

4. The method of claim 1, wherein the output of the direct rendering call is first rendered to an off-screen memory buffer, and is then stored to the texture.

5. The method of claim 1, further comprising single buffering of the texture.

6. The method of claim 1, further comprising double buffering of the texture, wherein double buffering the texture prevents a user from seeing partially rendered frames.

7. The method of claim 1, further comprising using a mechanism to avoid redirecting a 3D foundation graphics library in the display server.

8. The method of claim 1, further comprising bypassing the redirection library when specified conditions are met, wherein graphics calls are sent to the direct rendering library which renders directly to the window on a display, thereby bypassing the display server, and wherein specified conditions include one of:
an allocation of the texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

9. A method for redirecting an output of direct rendering graphics calls in a 3D window system, comprising:
interposing a redirection library between an application and a direct rendering library in the 3D window system;
intercepting a direct rendering call in the redirection library;
rendering the direct rendering call under control of the application into a texture rather than rendering to a window on a screen of a display device; and
displaying the texture under control of a display server on a 3D shape on the display device.

10. The method of claim 9, wherein the texture is shared between the application and the display server and wherein the texture is locked by the application when the texture is in use by the application and wherein the texture is locked by the display server when the texture is in use by the display server.

11. The method of claim 9, wherein the output of the direct rendering call is directly rendered by the application to the texture.

12. The method of claim 9, wherein the output of the direct rendering call is first rendered by the application to an off-screen memory buffer, and is then stored to the texture.

13. The method of claim 9, further comprising single buffering of the texture.

14. The method of claim 9, further comprising double buffering of the texture, wherein double buffering the texture prevents a user from seeing partially rendered frames.

15. The method of claim 9, further comprising using a mechanism to avoid redirecting a 3D foundation graphics library in the display server.

16. The method of claim 9, further comprising bypassing the redirection library when specified conditions are met, wherein graphics calls are sent to the direct rendering library which renders directly to the window on a display, and wherein specified conditions include one of:
an allocation of the texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

17. A method for bypassing redirection of redirected 2D rendering calls in a 3D window system when specified conditions are met, wherein bypassing provides for greater rendering performance, and wherein specified conditions include one of:
an allocation of a texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

18. A computer-readable storage medium storing instructions that when executed by a computer cause the computer to perform a method for redirecting an output of direct rendering graphics calls in a 3D window system, the method comprising:
interposing a redirection library between an application and a direct rendering library in the 3D window system;
intercepting a direct rendering call in the redirection library;
routing the direct rendering call to a display server;
rendering the direct rendering call through the display server into a texture rather than rendering the direct rendering call into a window on a screen of a display device; and
displaying the texture on a 3D shape on the display device.

19. The computer-readable storage medium of claim 18, wherein the texture is not shared between multiple clients.

20. The computer-readable storage medium of claim 18, wherein the output of the direct rendering call is directly rendered by the display server to the texture.

21. The computer-readable storage medium of claim 18, wherein the output of the direct rendering call is first rendered to an off-screen memory buffer, and is then stored to the texture.

22. The computer-readable storage medium of claim 18, the method further comprising single buffering of the texture.

23. The computer-readable storage medium of claim 18, the method further comprising double buffering of the texture, wherein double buffering the texture prevents a user from seeing partially rendered frames.

24. The computer-readable storage medium of claim 18, the method further comprising using a mechanism to avoid redirecting a 3D foundation graphics library in the display server.

25. The computer-readable storage medium of claim 18, the method further comprising bypassing the redirection library when specified conditions are met, wherein graphics calls are sent to the direct rendering library which renders directly to the window on a display, thereby bypassing the display server, and wherein specified conditions include one of:
an allocation of the texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

26. A computer-readable storage medium storing instructions that when executed by a computer cause the computer to perform a method for redirecting an output of direct rendering graphics calls in a 3D window system, comprising:

interposing a redirection library between an application and a direct rendering library in the 3D window system;
intercepting a direct rendering call in the redirection library;
rendering the direct rendering call under control of the application into a texture rather than rendering to a window on a screen of a display device; and
displaying the texture under control of a display server on a 3D shape on the display device.

27. The computer-readable storage medium of claim 26, wherein the texture is shared between the application and the display server and wherein the texture is locked by the application when the texture is in use by the application and wherein the texture is locked by the display server when the texture is in use by the display server.

28. The computer-readable storage medium of claim 26, wherein the output of the direct rendering call is directly rendered by the application to the texture.

29. The computer-readable storage medium of claim 26, wherein the output of the direct rendering call is first rendered by the application to an off-screen memory buffer, and is then stored to the texture.

30. The computer-readable storage medium of claim 26, the method further comprising single buffering of the texture.

31. The computer-readable storage medium of claim 26, the method further comprising double buffering of the texture, wherein double buffering the texture prevents a user from seeing partially rendered frames.

32. The computer-readable storage medium of claim 26, the method further comprising using a mechanism to avoid redirecting a 3D foundation graphics library in the display server.

33. The computer-readable storage medium of claim 26, the method further comprising bypassing the redirection library when specified conditions are met, wherein graphics calls are sent to the direct rendering library which renders directly to the window on a display, and wherein specified conditions include one of:
an allocation of the texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

34. A computer-readable storage medium storing instructions that when executed by a computer cause the computer to perform a method bypassing redirection of redirected 2D rendering calls in a 3D window system when specified conditions are met, wherein bypassing provides for greater rendering performance, and wherein specified conditions include one of:
an allocation of a texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

35. An apparatus for redirecting an output of direct rendering graphics calls in a 3D window system, comprising:
a redirection library interposed between an application and a direct rendering library in the 3D window system;
an intercepting mechanism configured to intercept a direct rendering call in the redirection library;
a routing mechanism configured to route the direct rendering call to a display server;
a rendering mechanism configured to render the direct rendering call through the display server into a texture rather than rendering the direct rendering call into a window on a screen of a display device; and
a displaying mechanism configured to display the texture on a 3D shape on the display device.

36. The apparatus of claim 35, wherein the texture is not shared between multiple clients.

37. The apparatus of claim 35, wherein the output of the direct rendering call is directly rendered by the display server to the texture.

38. The apparatus of claim 35, wherein the output of the direct rendering call is first rendered to an off-screen memory buffer, and is then stored to the texture.

39. The apparatus of claim 35, further comprising a single buffering mechanism configured to single buffer the texture.

40. The apparatus of claim 35, further comprising a double buffering mechanism configured to double buffer the texture, wherein double buffering the texture prevents a user from seeing partially rendered frames.

41. The apparatus of claim 35, further comprising a mechanism to avoid redirecting a 3D foundation graphics library in the display server.

42. The apparatus of claim 35, further comprising a bypassing mechanism configured to bypass the redirection library when specified conditions are met, wherein graphics calls are sent to the direct rendering library which renders directly to the window on a display, thereby bypassing the display server, and wherein specified conditions include one of:
an allocation of the texture fails;
the allocation of an off-screen memory buffer fails; and
a destination window has a rectangular shape, is parallel to an image plane of a 3D viewing transformation, is 100% opaque, and is not overlapped by any other graphical objects in the display server's scene graph.

43. An apparatus for redirecting an output of direct rendering graphics calls in a 3D window system, comprising:
a redirection library interposed between an application and a direct rendering library in the 3D window system;
an intercepting mechanism configured to intercept a direct rendering call in the redirection library;
a rendering mechanism configured to render the direct rendering call under control of the application into a texture rather than rendering to a window on a screen of a display device; and
a displaying mechanism configured to display the texture under control of a display server on a 3D shape on the display device.

44. The apparatus of claim 43, wherein the texture is shared between the application and the display server and wherein the texture is locked by the application when the texture is in use by the application and wherein the texture is locked by the display server when the texture is in use by the display server.

45. The apparatus of claim 43, wherein the output of the direct rendering call is directly rendered by the application to the texture.

46. The apparatus of claim 43, wherein the output of the direct rendering call is first rendered by the application to an off-screen memory buffer, and is then stored to the texture.

47. The apparatus of claim 43, further comprising a single buffering mechanism configured to single buffer the texture.

48. The apparatus of claim 43, further comprising a double buffering mechanism configured to double buffer the texture, wherein double buffering the texture prevents a user from seeing partially rendered frames.

49. The apparatus of claim 43, further comprising a mechanism to avoid redirecting a 3D foundation graphics library in the display server.

50. The apparatus of claim 43, further comprising a bypassing mechanism configured to bypass the redirection library when specified conditions are met, wherein graphics calls are sent to the direct rendering library which renders directly to the window on a display, and wherein specified conditions include one of:

an allocation of the texture fails;

the allocation of an off-screen memory buffer fails; and a destination window has a rectangular shape, is parallel to an image plane of a 3D viewing transformation, is 100% opaque, and is not overlapped by any other graphical objects in the display server's scene graph.

51. An apparatus for bypassing redirection of redirected 2D rendering calls in a 3D window system when specified conditions are met, wherein bypassing provides for greater rendering performance, and wherein specified conditions include one of:

an allocation of a texture fails;

the allocation of an off-screen memory buffer fails; and a destination window has a rectangular shape, is parallel to an image plane of a 3D viewing transformation, is 100% opaque, and is not overlapped by any other graphical objects in the display server's scene graph.

* * * * *